United States Patent
Yao

(10) Patent No.: US 9,655,152 B2
(45) Date of Patent: May 16, 2017

(54) OPERATING ENVIRONMENT SETTING SYSTEM OF ELECTRONIC DEVICE, OPERATING ENVIRONMENT SETTING METHOD AND OPERATING ENVIRONMENT SETTING PROGRAM

(71) Applicant: E3 Co., Ltd., 32F, Tokyo (JP)

(72) Inventor: Bingwei Yao, Tokyo (JP)

(73) Assignee: E3 CO., LTD, Tokyo (JP)

( * ) Notice: Subject to any disclaimer, the term of this patent is extended or adjusted under 35 U.S.C. 154(b) by 0 days.

(21) Appl. No.: 15/115,423

(22) PCT Filed: Oct. 15, 2014

(86) PCT No.: PCT/JP2014/077388
§ 371 (c)(1),
(2) Date: Jul. 29, 2016

(87) PCT Pub. No.: WO2016/059680
PCT Pub. Date: Apr. 21, 2016

(65) Prior Publication Data
US 2017/0034859 A1    Feb. 2, 2017

(51) Int. Cl.
*H04B 7/00*    (2006.01)
*H04W 76/02*   (2009.01)
*H04W 84/12*   (2009.01)

(52) U.S. Cl.
CPC .......... *H04W 76/021* (2013.01); *H04W 84/12* (2013.01)

(58) Field of Classification Search
CPC .................................................. H04W 84/12
See application file for complete search history.

(56) References Cited

U.S. PATENT DOCUMENTS

| 2011/0183612 A1 | 7/2011 | Bregman-Amitai et al. |
| 2013/0157573 A1* | 6/2013 | Aldaz .................. H04W 4/008 455/41.2 |

(Continued)

FOREIGN PATENT DOCUMENTS

| CN | 103037538 A1 | 4/2013 |
| EP | 2603019 A1 | 6/2013 |

(Continued)

*Primary Examiner* — Hsin-Chun Liao
(74) *Attorney, Agent, or Firm* — Polsinelli PC

(57) ABSTRACT

There are provided a code reading unit 12 for reading a code in a smartphone 10, an operating environment setting unit 13 for analyzing the read code, thereby acquiring first operating environment setting information required for setting to perform connection through Bluetooth to a relay device 20 to set the information to the smartphone 10, a setting information transmitting unit 14 for reading second operating environment setting information required for setting to perform wireless connection through Wi-Fi from a setting information storing unit 11 and transmitting the information to the relay device 20, and a second operating environment setting unit 23 for setting the received second operating environment setting information to the relay device 20. Even if the relay device 20 does not include a code reading device, it is possible to automatically set the connection through the Bluetooth, and furthermore, to automatically set the wireless connection through the Wi-Fi to the relay device 20 by reading the code in the smartphone 10.

6 Claims, 6 Drawing Sheets

(56) References Cited

U.S. PATENT DOCUMENTS

2015/0110092 A1* 4/2015 Bae .................. A61B 5/0022
  370/338
2015/0126109 A1* 5/2015 Keshavdas ........... H04B 5/0031
  455/41.1

FOREIGN PATENT DOCUMENTS

| JP | 2009-135688 A | 6/2009 |
| JP | 2010-258783 A | 11/2010 |
| JP | 2013-98980 A | 10/2012 |
| JP | 2014-127729 A | 12/2012 |
| JP | 2013-150150 A | 8/2013 |
| JP | 2014-179884 A | 9/2014 |

* cited by examiner

OPERATING ENVIRONMENT SETTING SYSTEM OF ELECTRONIC DEVICE, OPERATING ENVIRONMENT SETTING METHOD AND OPERATING ENVIRONMENT SETTING PROGRAM

CROSS REFERENCE TO RELATED APPLICATIONS

This application is a National Phase filing under 35 U.S.C. §371 of PCT/JP2014/077388 filed on Oct. 15, 2014. The entire content of this application is hereby incorporated by reference.

TECHNICAL FIELD

The present invention relates to an operating environment setting system of an electronic device, operating environment setting method and an operating environment setting program, and more particularly, is suitably used for a system for reading a code to automatically set an operating environment of the electronic device.

BACKGROUND ART

With a recent technological innovation, there are offered various electronic devices, for example, a smartphone, a personal computer and peripherals thereof, a tablet terminal, a navigation device, digital appliances, an electronic measuring machine and the like. In particular, recently, there has been widely generalized an apparatus having a plurality of electronic devices connected wirelessly and capable of mutually performing data communication.

As the technology for connecting the electronic devices wirelessly, a wireless LAN such as Wi-Fi and Bluetooth (registered trademark and so forth) are currently used most widely. They are very convenient because an electronic device can be utilized without being restricted by wiring differently from wire connection such as a cable and the electronic devices can be connected anywhere within a range where radio waves reach.

In order to wirelessly connect electronic devices by a wireless LAN or Bluetooth, however, various setting is required to be performed previously for the electronic devices and a user needs a certain degree of knowledge for connection. For example, in case of the wireless LAN, it is necessary to perform connection setting by registering, as a profile in an electronic device serving as a slave unit, connection setting information including an SSID (Service Set Identifier) to be transmitted from a master unit such as an access point or a wireless router and a cipher mode and a password which are defined in the master unit.

On the other hand, in case of the Bluetooth, it is necessary to set pairing between electronic devices to mutually make communication. In other words, when the Bluetooth communication function of a certain electronic device is started, information such as a name or a serial number is transmitted from all Bluetooth compatible devices existing in the vicinity and is displayed as a list. Therefore, a user selects an electronic device which is wanted to be connected from the list, thereby setting Bluetooth connection to the selected electronic device.

Conventionally, there is known the technology which can automatically perform setting of wireless connection by offering necessary information for setting the wireless connection with use of a bar code or a two-dimensional code (hereinafter referred to as a "code" if neither of them are particularly distinguished) and reading the offered code through an electronic device (for example, see Patent Documents 1 and 2).

The Patent Document 1 describes that necessary information for setting a wireless LAN is offered by a two-dimensional code and a wireless LAN terminal to be an electronic device having a wireless LAN communication function reads the two-dimensional code to reflect the setting on the wireless LAN terminal. Moreover, the Patent Document 1 describes that status information indicative of a state of a master unit as well as information about the wireless connection setting are offered by the two-dimensional code.

On the other hand, the Patent Document 2 describes that an external message (bar code data obtained by encoding an MAC address and a model code of an external device) is read in a noncontact type through an electronic device and necessary data for establishing Bluetooth connection to the external device is acquired from the external device in the noncontact type based on the MAC address of the external device which is identified from the read external message.

Patent Document 1: Japanese Laid-Open Patent Publication No. 2013-150150
Patent Document 2: Japanese Laid-Open Patent Publication No. 2013-98980

DISCLOSURE OF THE INVENTION

Referring to the technology described in the Patent Document 1, however, the electronic device which tries to set the necessary information for the wireless LAN connection is required to include a reading device such as a camera or a code reader in order to read a code. In case of an electronic device having no reading device, therefore, there is a problem in that it is impossible to automatically set the wireless LAN connection by application of the technology described in the Patent Document 1.

For example, the following case is supposed. In other words, a relay device having a wireless LAN communication function through Wi-Fi and an infrared communication function is provided in a room. An operation signal of a digital appliance is transmitted from a visiting destination by means of a smartphone or the like. Then, the relay device receives the operation signal from an access point by a wireless LAN, converts the operation signal into an infrared operation signal and transmits the infrared operation signal, thereby operating the digital appliance.

In such a case, it is necessary to previously perform wireless LAN (Wi-Fi) connection setting to the relay device. However, it is not necessary to read a code in relation to the relay of the operation signal. For this reason, the relay device usually has no reading device. With respect to the relay device, therefore, it is impossible to automatically perform the wireless LAN connection setting by the application of the technology described in the Patent Document 1. Consequently, a user should manually perform the setting in the same manner as in the conventional technology.

Although the problem of the related art has been described in relation to the wireless LAN connection setting, the problem is not restricted thereto. In other words, there is also a problem in that the electronic device having no reading device cannot automatically set the other operating environments by reading a code and a user should manually perform the setting. For example, an electronic measuring machine needs to perform calibration for sensors provided therein before start of use. However, there is conventionally a problem in that a user should manually set necessary information for the calibration.

The present invention has been made for solving these problems and has an object to enable an operating environment of an electronic device having no reading device for reading a code to be simply set by reading the code.

In order to attain the object, in the present invention, a code recording first operating environment setting information required for setting to perform wireless connection between a first electronic device and a second electronic device is read and the read code is analyzed to set necessary information for the wireless connection to the first electronic device in the first electronic device. In addition thereto, in the present invention, second operating environment setting information required for setting an operating environment of the second electronic device is read from a setting information storing unit provided in the first electronic device and is then transmitted to the second electronic device by utilizing the wireless connection set as described above. Thus, the second operating environment setting information is set to the second electronic device.

According to the present invention having the structure described above, if a code is read by the first electronic device including a code reading device, the wireless connection between the first electronic device and the second electronic device is automatically set by reading the code. Furthermore, necessary information for setting the operating environment of the second electronic device is transmitted from the first electronic device to the second electronic device by utilizing the set wireless connection, and the operating environment of the second electronic device is set automatically. Even if the second electronic device includes no code reading device, consequently, it is possible to easily set the operating environment of the second electronic device by reading the code.

BEST MODE FOR CARRYING OUT THE INVENTION (First Embodiment)

Figure 1:
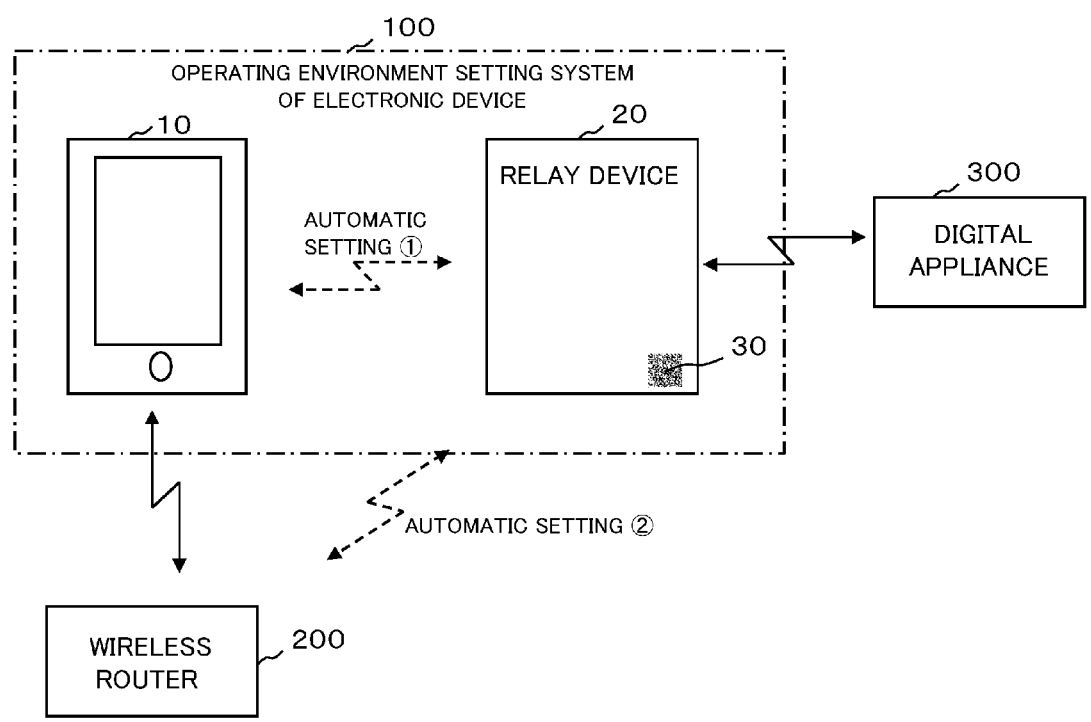
FIG. 1 is a diagram showing a schematic structure of an operating environment setting system of an electronic device according to a first embodiment.

A first embodiment according to the present invention will be described below with reference to the drawings. FIG. 1 is a diagram showing a schematic structure of an operating environment setting system of an electronic device according to the first embodiment.

As shown in FIG. 1, an operating environment setting system 100 of an electronic device according to the first embodiment includes a first electronic device 10 and a second electronic device 20 and can automatically set operating environments of the first electronic device 10 and the second electronic device 20 by reading a code 30. An operating environment to be set in the first embodiment relates to Bluetooth connection between the first electronic device 10 and the second electronic device 20 and wireless LAN connection between the second electronic device 20 and a wireless router 200.

The first electronic device 10 is a smartphone, for example, and has a wireless communication function through Bluetooth and a wireless communication function through a wireless LAN such as Wi-Fi. Moreover, the smartphone 10 has a camera and can read the code 30.

In the first embodiment, it is assumed that necessary information for performing wireless communication by the wireless LAN through the wireless router 200 has already been set to the smartphone 10. In other words, necessary connection setting information (an SSID, a cipher mode, a password or the like) for wireless LAN connection has been registered, in the smartphone 10, as a profile of the wireless router 200 which is a master unit. A user can manually set this wireless LAN connection. In the same manner as in the Patent Document 1, alternatively, the setting may be automatically performed by reading a code using a camera provided in the smartphone 10.

The second electronic device 20 is a relay device, for example, and has a wireless communication function through Bluetooth and a wireless communication function through a wireless LAN such as Wi-Fi. However, the relay device 20 includes neither a camera nor a code reader and cannot read the code 30. The relay device 20 can operate a digital appliance 300 by receiving an operation signal via a wireless LAN through the wireless router 200, and converting the operation signal into an infrared operation signal and transmitting the infrared operation signal, for example.

The code 30 is stuck or printed onto the relay device 20. Although the code 30 is a bar code or a two-dimensional code as an example, it is not restricted thereto. In other words, if the code is obtained by converting information in accordance with a fixed rule and can be input/output as digital information which can easily be read by a reading device such as a camera or a code reader, it may take configurations other than the bar code or the two-dimensional code.

In the present embodiment, necessary information (first operating environment setting information) for setting to perform wireless connection to the relay device 20 through Bluetooth by the smartphone 10 is recorded in the code 30. Herein, the first operating environment setting information is information including a name and a serial number of the relay device 20, and the like. The smartphone 10 acquires these information to carry out setting so that connection setting (pairing) of the Bluetooth to the relay device 20 is performed.

Necessary connection setting information for performing wireless connection to the wireless router 200 (a profile of the wireless router 200) is not recorded in the code 30. The reason is that a person generating the code 30 cannot previously (in generation of the code 30) suppose at all which wireless router 20 to be connected wirelessly by a user. In other words, information about the relay device 20 itself where the code 30 is to be stuck or printed is only recorded in the code 30.

Figure 2:
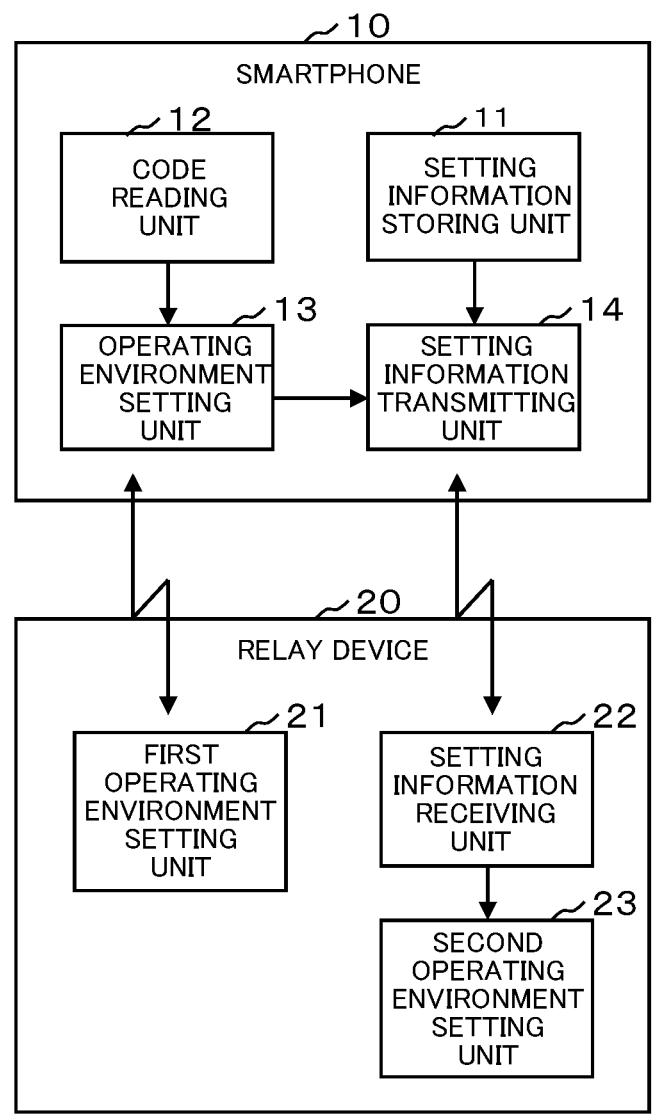
FIG. 2 is a block diagram showing an example of a functional structure of the operating environment setting system of the electronic device according to the first embodiment.

FIG. 2 is a block diagram showing an example of a functional structure of the operating environment setting system of the electronic device according to the first embodiment. FIG. 2 illustrates only a main functional structure related to setting of the operating environments of the smartphone 10 and the relay device 20.

As shown in FIG. 2, the smartphone 10 includes, as a functional structure thereof, a setting information storing unit 11, a code reading unit 12, an operating environment setting unit 13 and a setting information transmitting unit 14. Moreover, the relay device 20 includes, as a functional structure thereof, a first operating environment setting unit 21, a setting information receiving unit 22 and a second operating environment setting unit 23.

Respective function blocks 12 to 14 of the smartphone 10 can be configured from all of hardware, a DSP (Digital Signal Processor) and software. For example, in the case in which they are configured from the software, for example, the respective function blocks 12 to 14 actually include a CPU, an RAM, an ROM and the like in a computer and are implemented by an operation of a program stored in a recording medium such as the RAM, the ROM, a hard disk or a semiconductor memory.

Similarly, respective function blocks 21 to 23 of the relay device 20 can be configured from all of hardware, a DSP and software. For example, in the case in which they are configured from the software, for example, the respective function blocks 21 to 23 actually include a CPU, an RAM, an ROM and the like in a computer and are implemented by an operation of a program stored in a recording medium such as the RAM, the ROM, a hard disk or a semiconductor memory.

The setting information storing unit 11 of the smartphone 10 is configured from a flash memory, for example, and stores necessary information (second operating environment setting information) for setting an operating environment of the relay device 20. In the first embodiment, the second operating environment setting information is necessary information for the relay device 20 to perform wireless communication by Wi-Fi through the wireless router 200. This is connection setting information including an SSID to be transmitted from the wireless router 200 and a cipher mode and a password which are defined in the wireless router 200, that is, information which has already been registered as a profile of the wireless router 200 (the master unit) by the smartphone 10 as described above.

The code reading unit 12 of the smartphone 10 serves to read the code 30 stuck or printed onto the relay device 20 via a camera (not shown) provided in the smartphone 10.

The operating environment setting unit 13 of the smartphone 10 analyzes the code 30 read by the code reading unit and acquires the first operating environment setting information (information including the name and serial number of the relay device 20 and the like) required for setting the wireless connection (pairing) to the relay device 20 through the Bluetooth, and sets the first operating environment setting information to the smartphone 10.

Moreover, the operating environment setting unit 13 transmits, to the relay device 20, necessary information (the information including the name and serial number of the smartphone 10 and the like) required for setting the wireless connection (pairing) to the relay device 20 through the Bluetooth by the smartphone 10. Thus, the necessary information for both the smartphone 10 and the relay device 20 is set so that the pairing through the Bluetooth is performed.

The smartphone 10 and the relay device 20 once subjected to the pairing are automatically connected from the next time.

When the setting of the wireless connection through the Bluetooth is to be performed by the operating environment setting unit 13 of the smartphone 10, the first operating environment setting unit 21 of the relay device 20 acquires the necessary information for setting the wireless connection (the information including the name and serial number of the smartphone 10 and the like) from the smartphone 10 and sets the information to the relay device 20. Consequently, the pairing through the Bluetooth is performed between the smartphone 10 and the relay device 20.

The setting information transmitting unit 14 of the smartphone 10 transmits the second operating environment setting information stored in the setting information storing unit 11 to the relay device 20 by utilizing the wireless connection through the Bluetooth which is set by the operating environment setting unit 13 and the first operating environment setting unit 21. When the smartphone 10 sets the wireless connection to the wireless router 200 through the Wi-Fi, it is predetermined to store the second operating environment setting information (the connection setting information) in a specific storage area of a flash memory which is the setting information storing unit 11. Accordingly, the setting information transmitting unit 14 can acquire the second operating environment setting information by accessing the specific storage area of the setting information storing unit 11.

The setting information receiving unit 22 of the relay device 20 receives the second operating environment setting information transmitted from the setting information transmitting unit 14 by utilizing the wireless connection through the Bluetooth which is set by the operating environment setting unit 13 and the first operating environment setting unit 21.

The second operating environment setting unit 23 of the relay device 20 acquires the second operating environment setting information received by the setting information receiving unit 22 (information such as an SSID, a cypher mode and a password which are required for the relay device 20 to perform wireless communication by Wi-Fi through the wireless router 200) and sets the information to the relay device 20. Consequently, there is brought a state in which the relay device 20 can be wirelessly connected to the same Wi-Fi network as the smartphone 10 through the wireless router 200.

Figure 3:
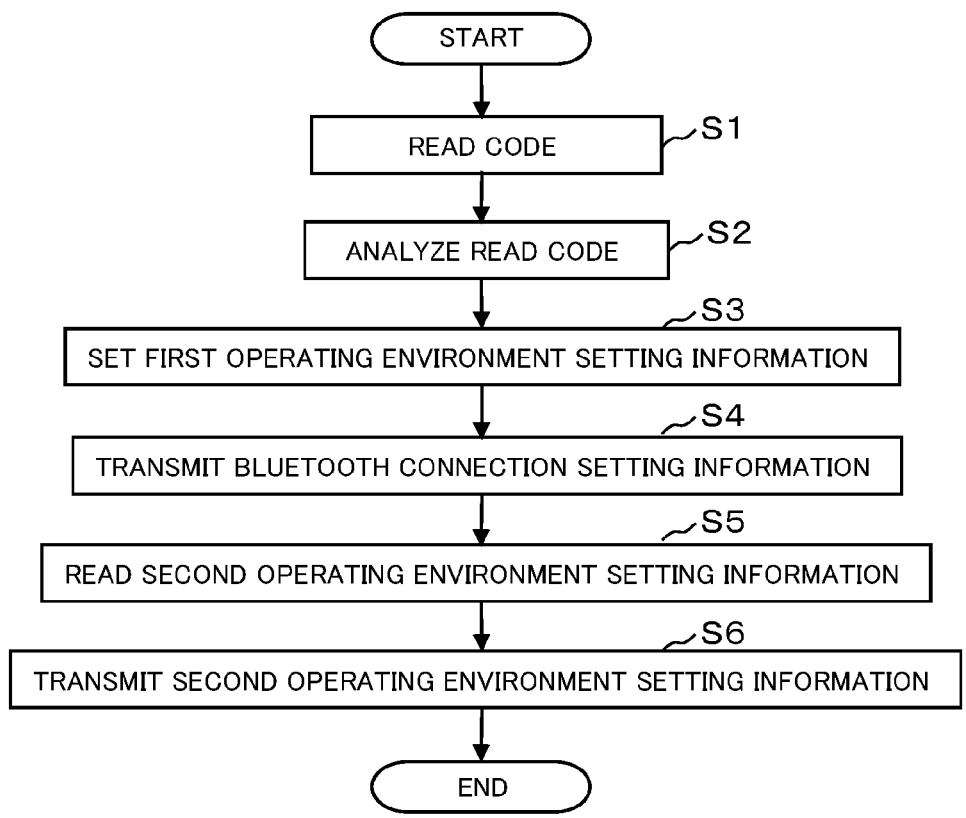
FIG. 3 is a flowchart showing an example of an operation of a smartphone according to the first embodiment.
Figure 4:
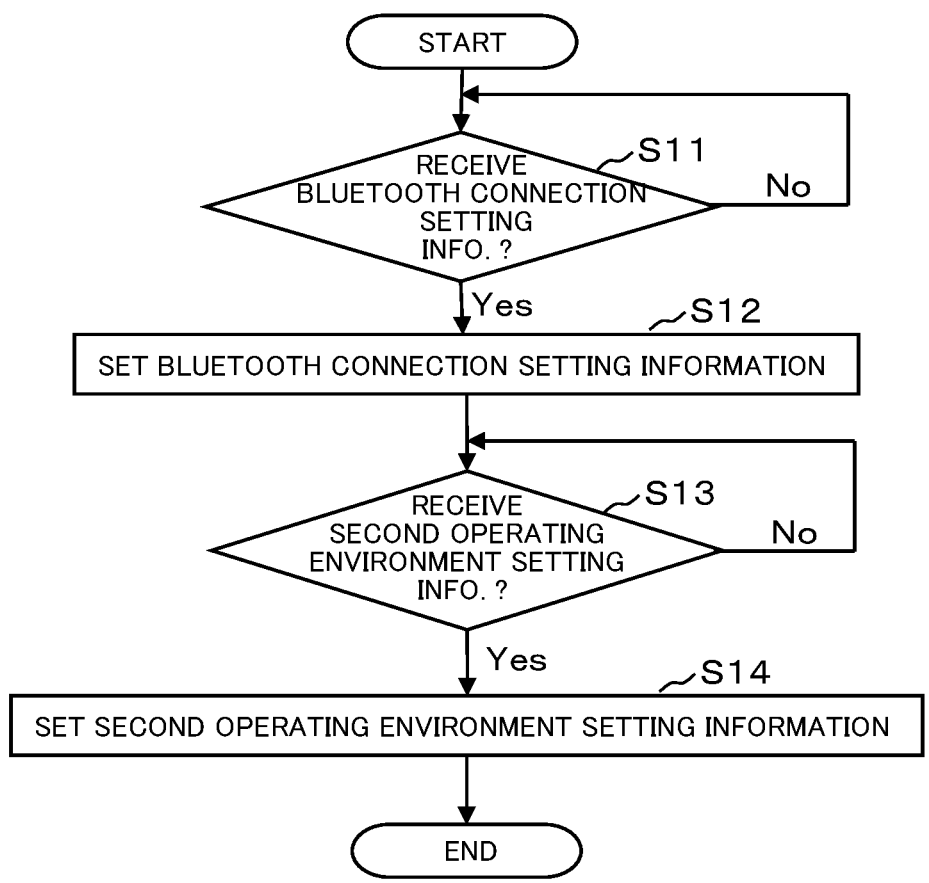
FIG. 4 is a flowchart showing an example of an operation of a relay device according to the first embodiment.

FIG. 3 is a flowchart showing an example of the operation of the smartphone 10 according to the first embodiment which is configured as described above. Moreover, FIG. 4 is a flowchart showing an example of the operation of the relay device 20 according to the first embodiment which is configured as described above. The flowcharts shown in FIGS. 3 and 4 are started when power supplies of the smartphone 10 and the relay device 20 are turned ON to activate the Bluetooth function of the smartphone 10, for example.

In FIG. 3, in the smartphone 10, the code reading unit 12 first reads the code 30 stuck or printed onto the relay device 20 (Step S1). Next, the operating environment setting unit 13 analyzes the code 30 read by the code reading unit 12 (Step S2), acquires the first operating environment setting information required for the smartphone 10 to perform the setting of the wireless connection through the Bluetooth to the relay device 20 (the information including the name or serial number of the relay device 20 and the like) and sets the information to the smartphone 10 (Step S3).

Moreover, the operating environment setting unit 13 transmits, to the relay device 20, the information required for the relay device 20 to perform the setting of the wireless connection through the Bluetooth to the smartphone 10 (the information including the name or serial number of the smartphone 10 and the like) (Step S4).

Next, the setting information transmitting unit 14 reads the second operating environment setting information stored in the setting information storing unit 11 (the SSID, the cypher mode and the password of the wireless router 200 and the like) (Step S5). Then, the setting information transmitting unit 14 transmits the second operating environment setting information thus read to the relay device 20 by utilizing the wireless connection through the Bluetooth which is set by the operating environment setting unit 13 (Step S6). Consequently, the processing of the flowchart shown in FIG. 3 is ended.

In FIG. 4, in the relay device 20, the first operating environment setting unit 21 first decides whether the information required for setting the wireless connection through the Bluetooth (the information including the name or serial number of the smartphone 10 and the like transmitted in the Step S4) is received from the smartphone 10 or not (Step S11). If the information is not received, the decision of the Step S11 is repeated.

On the other hand, if the information required for setting the wireless connection through the Bluetooth is received from the smartphone 10 by the first operating environment setting unit 21, the first operating environment setting unit 21 sets the received information to the relay device 20, thereby performing the pairing through the Bluetooth between the smartphone 10 and the relay device 20 (Step S12).

Next, the setting information receiving unit 22 decides whether the second operating environment setting information transmitted by the setting information transmitting unit 14 of the smartphone 10 is received or not (Step S13). Herein, if the second operating environment setting information is not received, the decision of the Step S13 is repeated.

On the other hand, if the setting information receiving unit 22 receives the second operating environment setting information, the second operating environment setting unit 23 acquires, from the setting information receiving unit 22, the second operating environment setting information thus received and sets the information to the relay device 20 (Step S14). Consequently, the processing of the flowchart shown in FIG. 4 is ended.

As described above in detail, according to the first embodiment, if the code 30 is read by the smartphone 10 including a camera, the setting of the wireless connection through the Bluetooth is performed automatically between the smartphone 10 and the relay device 20 by reading the code 30. Furthermore, information required for setting to perform the wireless LAN communication through Wi-Fi in the relay device 20 is transmitted from the smartphone 10 to the relay device 20 by utilizing the wireless connection through the Bluetooth which is set, and the wireless connection setting for the relay device 20 is automatically carried out. Even if the relay device 20 does not include a device for reading the code 30, consequently, it is possible to easily perform the operating environment setting of the relay device 20 (the wireless connection setting through the Bluetooth and the Wi-Fi) by reading the code 30.

(Second Embodiment)

Next, a second embodiment according to the present invention will be described with reference to the drawings.

Figure 5:
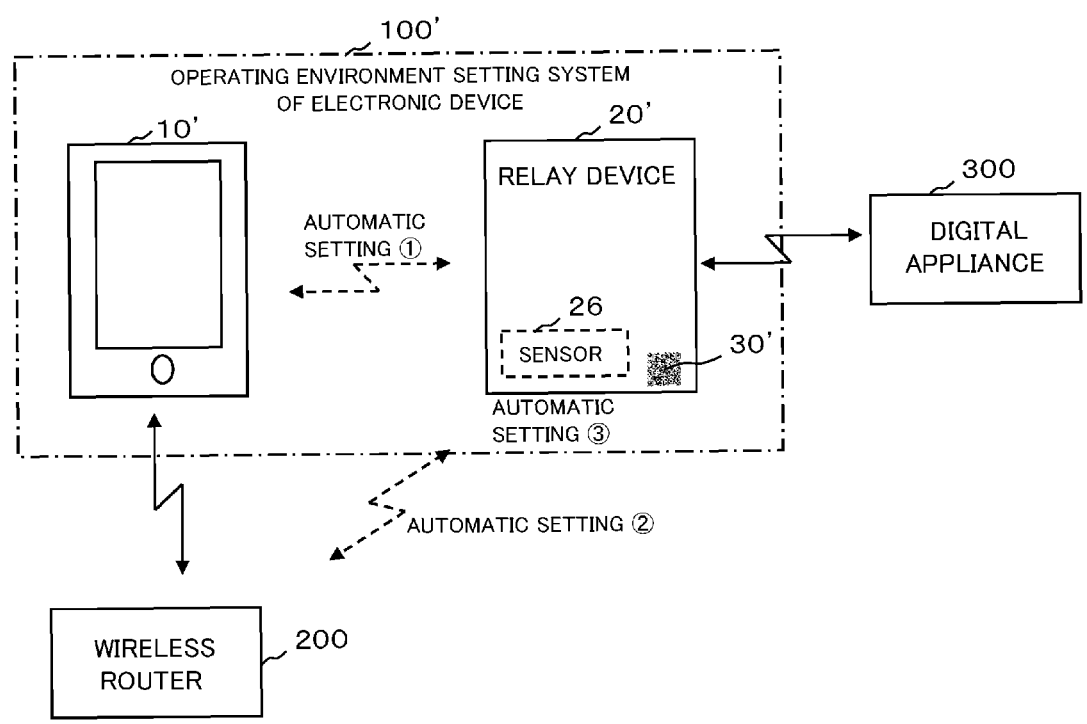
FIG. 5 is a diagram showing a schematic structure of an operating environment setting system of an electronic device according to a second embodiment.

FIG. 5 is a diagram showing a schematic structure of an operating environment setting system of an electronic device according to the second embodiment.

As shown in FIG. 5, an operating environment setting system 100' of an electronic device according to the second embodiment includes a first electronic device 10' and a second electronic device 20' and can automatically set operating environments of the first electronic device 10' and the second electronic device 20' by reading a code 30'. An operating environment to be set in the second embodiment relates to Bluetooth connection between the first electronic device 10' and the second electronic device 20', wireless LAN connection between the second electronic device 20' and a wireless router 200, and calibration of a sensor 26 provided in the second electronic device 20'.

The first electronic device 10' is a smartphone, for example, and has a wireless communication function through Bluetooth and a wireless communication function through a wireless LAN such as Wi-Fi. Moreover, the smartphone 10' has a camera and can read the code 30'. Also in the second embodiment, it is assumed that second operating environment setting information required for performing wireless communication through the wireless router 200 has already been set to the smartphone 10'.

The second electronic device 20' is a relay device, for example, and has a wireless communication function through the Bluetooth and a wireless communication function through the wireless LAN such as Wi-Fi. However, the relay device 20' includes neither a camera nor a code reader and cannot read the code 30'. In the second embodiment, the relay device 20' also has a function as a measuring device including a sensor. The sensor may be a temperature sensor, a humidity sensor, a PM2.5 sensor, a radiation sensor or the like, for example, and its type is optional.

Third operating environment setting information is recorded in the code 30' stuck or printed onto the relay device 20' in addition to the first operating environment setting information which is required for setting to perform the wireless connection to the relay device 20' through the Bluetooth by the smartphone 10' The third operating environment setting information is required for performing calibration of the sensor provided in the relay device 20'.

Figure 6:
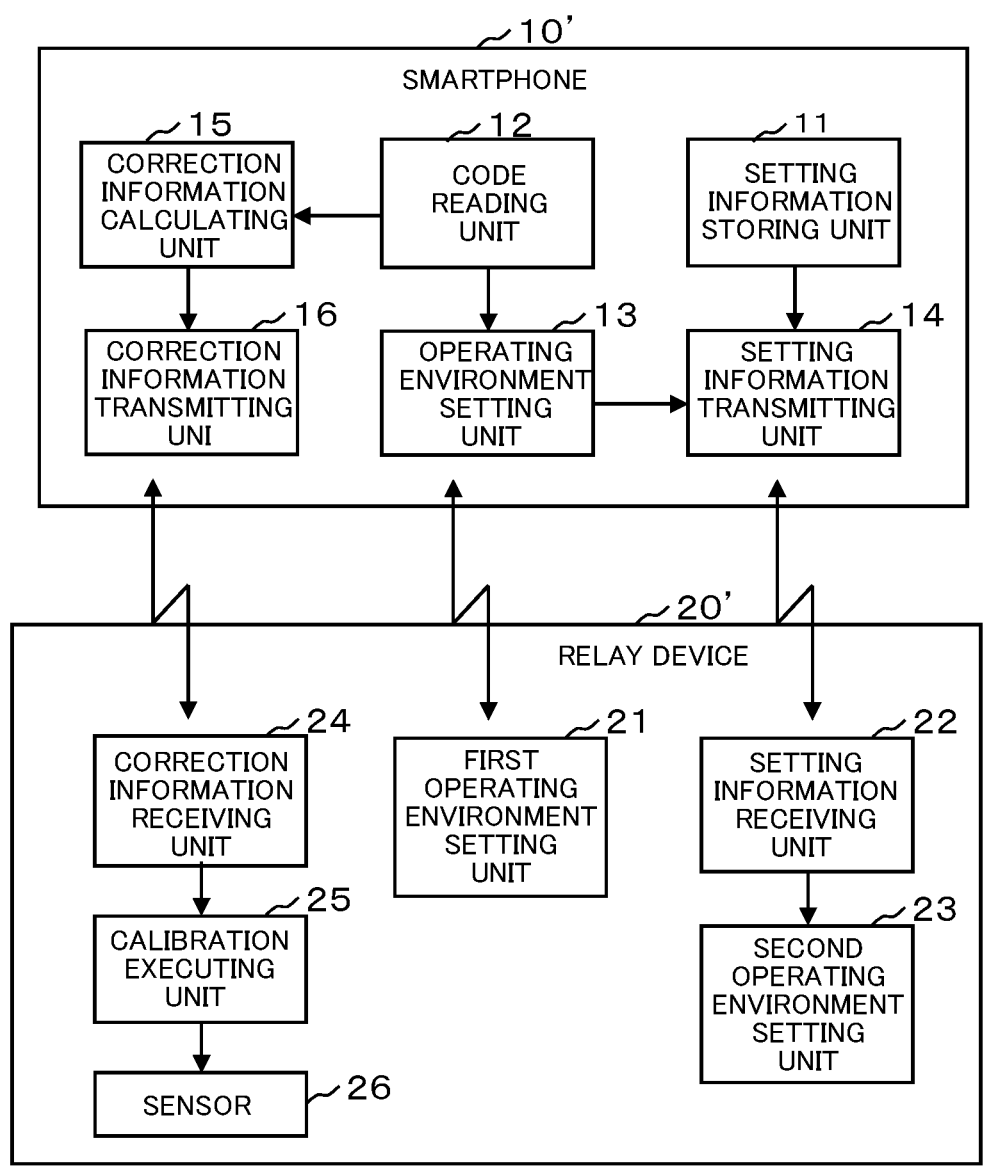
FIG. 6 is a block diagram showing an example of a functional structure of the operating environment setting system of the electronic device according to the second embodiment.

FIG. 6 is a block diagram showing an example of a functional structure of the operating environment setting system of the electronic device according to the second embodiment. In FIG. 6, components having the same reference numerals as those shown in FIG. 2 include the same functions, and therefore, repetitive explanation will be omitted herein.

In the second embodiment, the smartphone 10' further includes a correction information calculating unit 15 and a correction information transmitting unit 16 as a functional structure thereof as shown in FIG. 6. Moreover, the relay device 20' further includes a correction information receiving unit 24 and a calibration executing unit 25 as a functional structure thereof, and furthermore, a sensor 26 as hardware.

The correction information calculating unit 15 of the smartphone 10' analyzes the code 30' read by a code reading unit 12 and acquires the third operating environment setting information to calculate correction information for performing calibration. For example, a calculation formula for calculating the correction information is prepared in advance and the third operating environment setting information acquired by analyzing the code 30' is substituted as a parameter for the calculation formula to calculate correction information for performing the calibration of the sensor 26.

Although the description has been given to the example in which the correction information is calculated from the third operating environment setting information acquired by analyzing the code 30' in the smartphone 10', the present invention is not restricted to this example. For instance, the third operating environment setting information itself may be encoded as the correction information for performing the calibration.

The correction information transmitting unit 16 of the smartphone 10' transmits the correction information calculated by the correction information calculating unit 15 to the relay device 20' with use of wireless connection through Bluetooth which is set by an operating environment setting unit 13 of the smartphone 10' and a first operating environment setting unit 21 of the relay device 20'.

The correction information receiving unit 24 of the relay device 20' receives the correction information transmitted by the correction information transmitting unit 16 of the smartphone 10'. The calibration executing unit 25 acquires the correction information received by the correction information receiving unit 24, thereby performing the calibration of the sensor 26.

According to the second embodiment having the structure described above, if the code 30' is read by the smartphone 10' including a camera, the setting of the wireless connection through the Bluetooth is automatically performed between the smartphone 10' and the relay device 20' by reading the code 30'. By utilizing the wireless connection through the Bluetooth thus set, furthermore, necessary information for setting to perform wireless LAN communication through Wi-Fi in the relay device 20' and necessary information for calibrating the sensor 26 of the relay device 20' are transmitted from the smartphone 10' to the relay device 20' so that the wireless connection setting of the relay device 20' and the calibration of the sensor 26 are automatically carried out. Even if the relay device 20' does not include a device for reading the code 30', consequently, it is possible to easily perform setting of the operating environment of the relay device 20' (wireless connection setting through the Bluetooth and the Wi-Fi and the calibration of the sensor 26) by reading the code 30'.

Although the description has been given by taking the smartphone as an example of the first electronic device in the first and second embodiments, the present invention is not restricted thereto. If the first electronic device has a wireless communication function through Bluetooth, a wireless LAN communication function through Wi-Fi and a code reading function, it is also possible to use an electronic device other than the smartphone.

Although the description has been given by taking the relay device as an example of the second electronic device in the first and second embodiments, moreover, the present invention is not restricted thereto. If the second electronic device has a wireless communication function through Bluetooth and a wireless LAN communication function through Wi-Fi, it is also possible to use an electronic device other than the relay device. For example, the second electronic device may be a wearable device such as a spectacle type, a watch type or a wristband type.

Although the description has been given to the example in which the smartphones 10 and 10' and the relay devices 20 and 20' are connected through the Bluetooth in the first and second embodiments, furthermore, it is also possible to apply a wireless communication technology other than the Bluetooth (for example, ZigBee or the like).

Although the wireless connection setting information through the Wi-Fi and the correction information to be used for the calibration of the sensor have been illustrated as the operating environment setting information to be transmitted from the smartphones 10 and 10' to the relay devices 20 and 20' in the first and second embodiments, moreover, the present invention is not restricted thereto. It is also possible to use information for setting the other operating environments.

In addition, the first and second embodiments are only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION

10, 10' smartphone (first electronic device)
11 setting information storing unit
12 code reading unit
13 operating environment setting unit
14 setting information transmitting unit
15 correction information calculating unit
16 correction information transmitting unit
20, 20' relay device (second electronic device)
21 first operating environment setting unit
22 setting information receiving unit
23 second operating environment setting unit
24 correction information receiving unit
25 calibration executing unit
26 sensor
30, 30' code
100, 100' operating environment setting system of electronic device

The invention claimed is:

1. An operating environment setting system of an electronic device comprising a first electronic device which is connected through wireless LAN to a wireless LAN master unit and a second electronic device and serving to set operating environments of the first electronic device and the second electronic device, wherein the first electronic device includes:
 a code reading unit for reading a code recording first operating environment setting information required for setting to perform wireless connection between the first electronic device and the second electronic device;
 a setting information storing unit for storing second operating environment setting information required for setting an operating environment to perform the wireless LAN connection to the wireless LAN master unit by the second electronic device;
 an operating environment setting unit for analyzing the code read by the code reading unit and acquiring the first operating environment setting information required for setting the wireless connection, thereby setting the information to the first electronic device; and
 a setting information transmitting unit for transmitting the second operating environment setting information stored in the setting information storing unit to the second electronic device by utilizing the wireless connection set by the operating environment setting unit, and the second electronic device includes:
 a first operating environment setting unit for acquiring necessary information for setting the wireless connection from the first electronic device to set the information to the second electronic device when setting the wireless connection by the operating environment setting unit;

a setting information receiving unit for receiving the second operating environment setting information transmitted by the setting information transmitting unit; and a second operating environment setting unit for acquiring the second operating environment setting information received by the setting information receiving unit to set the information to the second electronic device.

2. The operating environment setting system of the electronic device according to claim 1, wherein the first operating environment setting information is necessary information for setting to perform wireless connection through Bluetooth between the first electronic device and the second electronic device, and the second operating environment setting information stored in the setting information storing unit is information in which the first electronic device has already been registered as a profile of the wireless LAN master unit.

3. The operating environment setting system of the electronic device according to claim 2, wherein the first operating environment setting information is necessary information for setting to perform wireless connection through Bluetooth between the first electronic device and the second electronic device, the code reading unit reads a code recording third operating environment setting information required for performing calibration of a sensor provided in the second electronic device in addition to the first operating environment setting information, the first electronic device further includes:

a correction information calculating unit for analyzing the code read by the code reading unit and acquiring the third operating environment setting information, thereby calculating correction information for performing the calibration; and a correction information transmitting unit for transmitting the correction information calculated by the correction information calculating unit to the second electronic device by utilizing the wireless connection set by the operating environment setting unit, and the second electronic device further includes:

a correction information receiving unit for receiving the correction information transmitted by the correction information transmitting unit; and a calibration executing unit for acquiring the correction information received by the correction information receiving unit to perform the calibration of the sensor.

4. The operating environment setting system of the electronic device according to claim 1, wherein the first operating environment setting information is necessary information for setting to perform wireless connection through Bluetooth between the first electronic device and the second electronic device, the code reading unit reads a code recording third operating environment setting information required for performing calibration of a sensor provided in the second electronic device in addition to the first operating environment setting information, the first electronic device further includes:

a correction information calculating unit for analyzing the code read by the code reading unit and acquiring the third operating environment setting information, thereby calculating correction information for performing the calibration; and a correction information transmitting unit for transmitting the correction information calculated by the correction information calculating unit to the second electronic device by utilizing the wireless connection set by the operating environment setting unit, and the second electronic device further includes:

a correction information receiving unit for receiving the correction information transmitted by the correction information transmitting unit; and a calibration executing unit for acquiring the correction information received by the correction information receiving unit to perform the calibration of the sensor.

5. A method of setting operating environments of a first electronic device which is connected through wireless LAN to a wireless LAN master unit and a second electronic device in a system including the first electronic device and the second electronic device, the method comprising:

a first step of causing a code reading unit in the first electronic device to read a code recording first operating environment setting information required for setting to perform wireless connection between the first electronic device and the second electronic device;

a second step of causing an operating environment setting unit in the first electronic device to analyze the code read by the code reading unit and to acquire the first operating environment setting information required for setting the wireless connection, thereby setting the information to the first electronic device;

a third step of causing a first operating environment setting unit in the second electronic device to acquire necessary information for setting the wireless connection from the first electronic device, thereby setting the information to the second electronic device when setting the wireless connection by the operating environment setting unit;

a fourth step of causing a setting information transmitting unit in the first electronic device to read second operating environment setting information from a setting information storing unit storing the second operating environment setting information required for setting the operating environment to perform the wireless LAN connection to the wireless LAN master unit by the second electronic device and to transmit the information to the second electronic device by utilizing the wireless connection set by the operating environment setting unit;

a fifth step of causing a setting information receiving unit in the second electronic device to receive the second operating environment setting information transmitted by the setting information transmitting unit; and a sixth step of causing a second operating environment setting unit in the second electronic device to acquire the second operating environment setting information received by the setting information receiving unit, thereby setting the information to the second electronic device.

6. A computer readable operating environment setting program to be mounted on a first electronic device in a system comprising the first electronic device which is connected through wireless LAN to a wireless LAN master unit and a second electronic device and serving to set operating environments of the first electronic device and the second electronic device, the program causing a computer to function as:

code reading means for reading a code recording first operating environment setting information required for setting to wirelessly connect the first electronic device and the second electronic device;

operating environment setting means for analyzing the code read by the code reading means and acquiring the first operating environment setting information required for setting the wireless connection, thereby setting the information to the first electronic device; and setting information transmitting means for reading second operating environment setting information from a setting information storing unit storing the second operating environment setting information required for setting an operating environment to perform the wireless LAN connection to the wireless LAN master unit by the second electronic device and transmitting the information to the second electronic device by utilizing the wireless connection set by the operating environment setting means.

* * * * *